United States Patent [19]

Groff

[11] 4,445,838
[45] May 1, 1984

[54] APPARATUS FOR EXTRUDING A COMESTIBLE

[76] Inventor: Edwin T. Groff, 120 S. 3rd Ave., West Reading, Pa. 19611

[21] Appl. No.: 453,145

[22] Filed: Dec. 27, 1982

[51] Int. Cl.³ .............................................. B29F 3/04
[52] U.S. Cl. .................................... 425/319; 264/103; 277/212 F; 425/334; 425/376 B; 425/382 R; 425/391; 425/392; 425/464; 425/467
[58] Field of Search ............... 425/382 R, 376 B, 464, 425/319, 323, 334, 391, 392, 381, 461; 277/11, 212 F; 426/499, 500, 501, 516, 517

[56] References Cited

U.S. PATENT DOCUMENTS

| | | | |
|---|---|---|---|
| 2,747,834 | 5/1956 | Meusy | 277/212 F |
| 3,849,046 | 11/1974 | Kalakov et al. | 425/382 R |
| 4,288,463 | 9/1981 | Groff et al. | 264/103 |
| 4,365,946 | 12/1982 | Anders | 425/376 B |

*Primary Examiner*—Jeffery R. Thurlow
*Assistant Examiner*—Douglas J. Theisen
*Attorney, Agent, or Firm*—Robert K. Youtie

[57] ABSTRACT

A comestible extruding apparatus including a pressure chamber having an outlet, a hollow extrusion die journaled in the outlet, and a hollow seal force fit in the outlet and having a neck extending slidably into the hollow die, the neck and die combining to define a rotary seal for the comestible.

10 Claims, 3 Drawing Figures

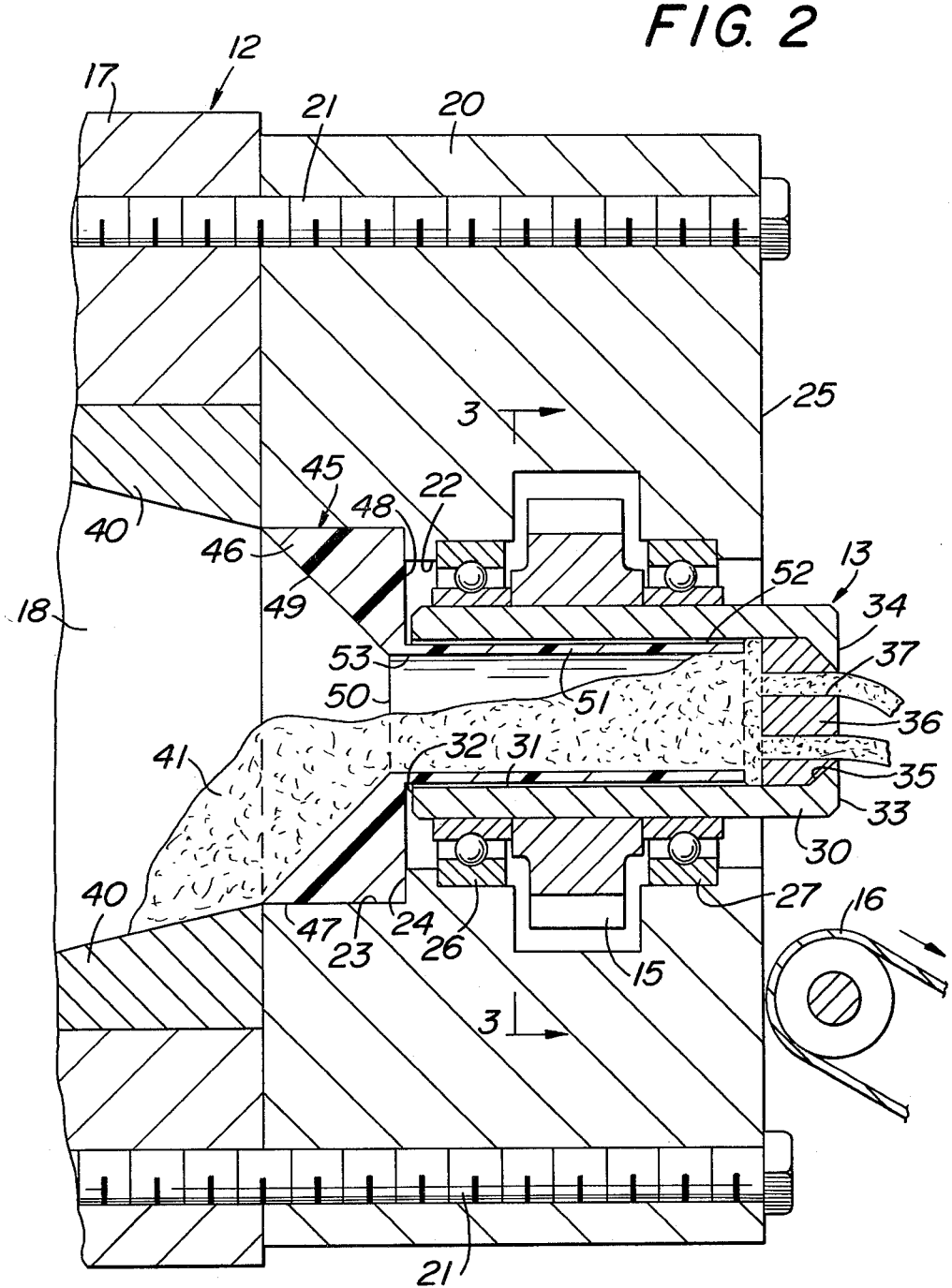

APPARATUS FOR EXTRUDING A COMESTIBLE

BACKGROUND OF THE INVENTION

The instant invention is concerned with the extrusion of viscous comestible material, such as pretzel dough, corn meal, or the like. The instant invention is intended for use with any such material of dough-like viscosity, all such materials being comprehended herein.

The apparatus of the instant invention is intended for use in practicing the method of prior U.S. Pat. No. 4,288,463, from which it will be seen that sealing was accomplished by packing rings, and the like. However, it was found in practice that such seals or gland construction was short lived, requiring frequent adjustment or replacement and involving expensive machine down time and labor.

Applicant is aware of the below listed prior art:

| U.S. PAT. NO. | PATENTEE |
| --- | --- |
| 2,138,378 | Johnson |
| 2,779,970 | Stocker |
| 3,134,832 | Smith |
| 3,243,848 | Miller et al. |
| 3,924,992 | Hegler |

SUMMARY OF THE INVENTION

It is an important object of the present invention to provide a seal construction for an extrusion machine wherein an elongate tubular seal includes an end enlargement secured fast in the extruder pressure chamber and a reduced neck extending into the rotary extrusion die in sliding engagement with the latter.

It is a further object of the present invention to provide a seal construction of the type mentioned in the preceding paragraph which is of greatly increased useful life, to effect substantial reduction in maintenance costs; and permits of substantially increased production speeds to further reduce capital expenditures and continuing costs.

It is still another object of the present invention to provide a seal construction for use in extruding comestibles, which does not require lubrication by any foreign material, is highly effective for extruding material of dough-like viscosity, and effects sealing by a relatively low pressure sliding fit to effectively reduce gear and motor loads for enhanced useful life of the drive components.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 2 is a sectional elevational view taken generally along the line 2—2 of FIG. 1, enlarged for clarity of detail.

DESCRIPTION OF THE PREFERRED EMBODIMENT

Figure 1:
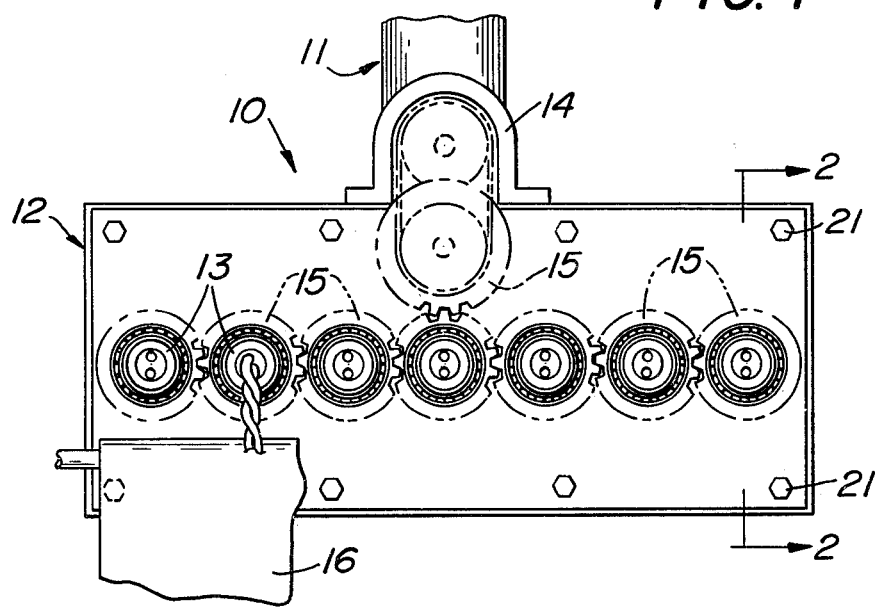
FIG. 1 is a front elevational view showing apparatus of the present invention looking toward the extrusion discharge, with a conveyor partly broken away.
Figure 3:
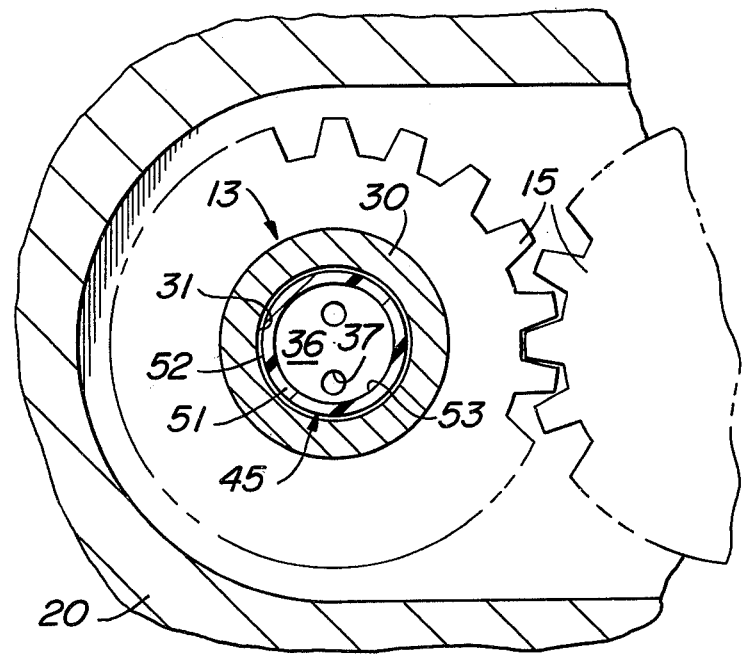
FIG. 3 is a partial sectional view taken generally along the line 3—3 of FIG. 2.

Referring now more particularly to the drawings, and specifically to FIG. 1 thereof, the extrusion apparatus of the present invention is there generally designated 10 and may include a pressure source 11, which may be a pump, piston, or other. An extrusion head 12 is connected to the pressure source 11, downstream therefrom, and mounted on the outlet end of the extrusion head may be a plurality of rotary extrusion dies 13. The dies 13 may be arranged in a horizontal row, as illustrated, or otherwise if desired, being rotated by a suitable motor or motive means 14 and interconnecting drive means such as gearing 15. Below the extrusion dies 13, downstream from the extrusion head 12, may be a conveyor or belt 16 for carrying away the extrusion product or extrudate.

Considering now the extrusion head 12 in greater detail, the head includes a hollow body 17 defining in the hollow thereof a pressurizing or pressure equalization chamber 18 which is in fluid communication on its inlet side, leftward as seen in FIG. 2, with the pressurizing or pump means 11. The extrusion head 12 includes a chamber outlet part or carrier plate on the downstream side of the hollow body 17 and bolted in facing engagement therewith, as by fasteners 21.

The outlet part or mounting plate 20 includes a plurality of outlet openings 22 communicating through the outlet part between the pressure chamber 18 and the exterior thereof, downstream from the extruder head 12. One such outlet opening 22 is shown in FIG. 2, exemplifying the remainder of the outlet openings.

The inner end region 23 of the outlet opening 22 is enlarged, concentrically with the remainder of the outlet opening and of a generally cylindrical internal surface configuration, extending from the hollow interior of the body part 17 outwardly to terminate in a generally flat, annular shoulder 24 normal to the axis of the outlet opening. The remainder of the outlet opening 22, between the annular shoulder 24 and the front or downstream face 25 of the outlet part 20 is suitably configured for mounting journal bearing means, such as antifriction bearings 26 and 27, and to spacedly receive a gear element 15.

The extrusion die 13 is of generally cylindrical external configuration, being coaxially mounted in bearings 26 and 27 and extending approximately from shoulder 24 outwardly through outlet opening 22 and beyond the exterior face 25 of outlet part 20. The drive means or gear 15 is circumposed about and suitably keyed to the extrusion die 13.

The extrusion die 13 may include a generally cylindrical tube 30 having its internal surface 31 generally cylindrical and of a constant circular cross-section from the inner end 32 to a point adjacent to the outer end 33. The outer end region 34 of the die tube 30 may gradually thicken internally toward the outer end 33 to define an internal tapering or conical surface 35. A plug or discharge member 36 may be engaged in the interior of the tube 30, adjacent to the outer end 33 and retained therein by conforming engagement with the cylindrical internal surface 31 and the conical internal surface 35, the plug or discharge member 36 being formed with one or more eccentric through holes or discharge openings 37.

Interiorly within the pressure chamber body 17, there may be pressure equalizing, product guiding members 40, being of gradually increasing thickness toward and terminating at the outlet part 20, meeting the opposite edges of the internally cylindrical inner end region 23. This serves to guide the dough product 41 smoothly through the pressure chamber 18 toward the outlet opening 22.

The seal of the present construction is generally designated 45 and is of an elongate tubular or funnel-like configuration. More specifically, the seal construction 45 may be an integral piece advantageously fabricated of material having a low coefficient of friction, ultra-high molecular weight polyethylene having been found satisfactory, but other similar materials may be adequate. The tubular or funnel-like seal construction 45 includes an inner end enlargement 46 having an externally cylindrical surface 47 coaxially of the seal construction and terminating in a generally flat, annular surface or shoulder 48. The inner end region 46 of the seal construction 45 has its internal surface 49 generally conical or tapering from intersection with the external surface 47 to a desired internal diameter 50. The apex or meeting edge of the cylindrical external surface 47 and the conical internal surface 49 meet at a juncture or meeting of the inner end of the internally cylindrical surface 23 and the outer extremity of the guide members 40.

Extending coaxially of and longitudinally outwardly from the seal construction enlarged entry part 46 is a generally cylindrical externally reduced neck or tubular extension 51. That is, the cylindrical neck or tubular extension 51 has its external cylindrical surface 52 considerably reduced with respect to the external cylindrical surface 47, coaxially thereof, and is closely and slidably received in the tube 30 of extrusion die 13, substantially throughout the length of the latter. The internal cylindrical surface 53 of the tubular extension or neck 51 remains constant throughout its length, and is of essentially the same diameter as the minimum diameter at 50 of the internal conical surface 49 of the entry enlargement 46.

In practice, the cylindrical external diameter 47 of the entry enlargement 46 is fabricated to a dimension just slightly larger than that of the internal cylindrical surface 23 of the outlet opening 22, so as to be an interference or force fit one within the other. The tubular extension or neck 51 may have an external diameter just slightly less than the internal diameter of the receiving die tube 30 for a low friction sliding engagement therein, the friction being further reduced by the characteristics of the material of seal construction 45. The wall thickness of tubular extension or neck 51 is minimized to permit maximum fluid flow therethrough, consistent with sufficient strength to resist the internal force of fluid pressure and the external force of sliding friction. There is, to some extent, expansion of the tubular extension 51 toward the die tube 30, so that the sliding fit therebetween effectively seals out the entry of the material 41 from between the extension 51 and tube 30. In practice, the length of the sliding fit between extension 51 and tube 30 may be determined by the operating pressure of the material 41.

By way of example, a highly satisfactory seal construction has employed a tubular extension 51 having a length on the order of 1.25 inches; an outside diameter on the order of 0.526 inches; and entry of the extension into the tube 30 on the order of 1.22 inches, the extension terminating short of the plug 36 on the order of 1/16 inch. With such dimensions an inside diameter of surface 31 on the order of 0.53125 inches has been found satisfactory, leaving a clearance with the tubular extension 51 of 0.0026 inches.

While the foregoing dimensions have been found entirely satisfactory in operation, it is believed that other dimensions may be also found satisfactory in utilizing the principles of the present invention in conjunction with different pressures and viscosity of the material 41, different shapes and sizes of extrusion die 13, and under other conditions of use.

Although the present invention has been described in some detail by way of illustration and example for purposes of clarity of understanding, it is understood that certain changes and modifications may be made within the spirit of the invention.

What is claimed is:

1. Apparatus for extruding a comestible, comprising a chamber for connection to a source of comestible under pressure, an outlet part on said chamber having an outlet opening, journal bearing means in said outlet opening, a hollow extrusion die journaled in said bearing means and having a discharge opening for discharging comestible extrudate while rotating the same, and a seal construction in said outlet opening and sealing the same against access by the comestible to the bearing means, said seal construction comprising an entry enlargement having a through opening and secured fast in said outlet opening upstream of said die to preclude the passage of comestible between said enlargement and the adjacent region of said outlet part, and a reduced tubular extension extending downstream from the through opening of said entry enlargement closely into said hollow die toward said discharge opening for sliding engagement with said die, said sliding engagement defining an effective rotary seal against access of comestible to said bearing means.

2. Apparatus according to claim 1, said entry enlargement and tubular extension being integral and fabricated of material having low coefficient of friction.

3. Apparatus according to claim 1, said outlet opening being configured to provide an internally cylindrical inner end region extending in the direction from the interior of said chamber to and terminating in and inwardly facing generally annular shoulder facing toward the interior of said chamber, said entry enlargement being configured to provide an external cylindrical formation of a diameter defining an interference fit in said internal cylindrical inner end region, said external cylindrical formation terminating in an outwardly facing annular shoulder facing away from the interior of said chamber and in abutting engagement with said inwardly facing annular shoulder.

4. Apparatus according to claim 3, said entry enlargement having a convergent internal configuration in the direction away from said chamber.

5. Apparatus according to claim 1, said hollow die having a generally cylindrical internal surface extending generally from the inner end of said die to said discharge opening, and said tubular extension having a generally cylindrical external surface for substantially complete surface engagement in said die.

6. Apparatus according to claim 5, said tubular extension having sliding clearance in said extrusion die sufficiently small to substantially preclude entry therein of a comestible of predetermined viscosity and pressure.

7. Apparatus according to claim 6, said tubular extension having a wall thickness sufficient to resist torsional distortion by said sliding engagement and responsive to increase in comestible pressure by reducing said sliding clearance.

8. Apparatus according to claim 6, said sliding engagement having a surface area sufficient to substantially preclude entry therein of a comestible of predetermined viscosity and pressure.

9. Apparatus according to claim 6, said sliding clearance being on the order of 0.002 inches, said tubular extension being on the order of 1.25 inches long and having a wall thickness on the order of 0.06 inches.

10. Apparatus according to claim 1, said entry enlargment being conformably force fit in said outlet opening.

* * * * *